United States Patent
Ausaf (10) Patent No.: US 6,386,095 B1
(45) Date of Patent: May 14, 2002

(54) SKEWERS MOUNTED ON AN OVEN CONVEYOR BELT

(76) Inventor: Nick Ausaf, 10167 Sailwinds Blvd., #102, Largo, FL (US) 33773

( * ) Notice: Subject to any disclaimer, the term of this patent is extended or adjusted under 35 U.S.C. 154(b) by 0 days.

(21) Appl. No.: 09/945,048

(22) Filed: Aug. 31, 2001

(51) Int. Cl.[7] .............................. A47J 37/00; A47J 37/04
(52) U.S. Cl. ........................ 99/420; 99/419; 99/421 H; 99/443 C; 99/427; 99/448
(58) Field of Search .................... 99/331, 339, 340, 99/352–355, 386, 419–421 V, 426, 427, 444–446, 447, 448, 443 R, 443 C, 477–479; 426/523, 243; 126/21 R, 41 R, 21 A, 25 R (56) References Cited

U.S. PATENT DOCUMENTS

| | | | |
|---|---|---|---|
| 611,595 A | * 10/1898 | Alderson | 99/421 H |
| 2,039,541 A | * 5/1936 | Lekometros | 99/339 |
| 2,467,480 A | * 4/1949 | Hudson | 99/419 |
| 2,655,096 A | * 10/1953 | Ebin | 99/443 C |
| 3,028,801 A | * 4/1962 | Watts | 99/419 |
| 3,734,740 A | * 5/1973 | Zenos | 426/523 X |
| 3,835,761 A | 9/1974 | Yamanaka | |
| 3,866,527 A | * 2/1975 | Katris | 99/339 |
| 3,939,761 A | * 2/1976 | McGinty | 99/421 H |
| 4,158,991 A | * 6/1979 | Nakashima | 99/421 H |
| 4,440,071 A | 4/1984 | Boosalis et al. | |
| 4,635,539 A | 1/1987 | Tanaka | |
| 4,760,776 A | * 8/1988 | Beidler | 99/419 |
| 4,887,727 A | * 12/1989 | Simmerman | 99/420 X |
| 5,001,971 A | * 3/1991 | Beller | 99/421 R |
| 5,271,316 A | * 12/1993 | Wisting | 99/420 |
| 5,377,582 A | 1/1995 | Nersesian | |
| 5,709,142 A | 1/1998 | Nersesian | |

* cited by examiner

*Primary Examiner*—Timothy F. Simone
(74) *Attorney, Agent, or Firm*—Larson & Larson, P.A.; James E. Larson (57) ABSTRACT

Multiple belt drives spaced apart transversely are engaged to multiple longitudinally spaced apart transversely mounted guide bars. The guide bars are juxtaposed to multiple parallel fixed longitudinally mounted spaced apart travel grooves. Skewers containing food items have wheels at each end for moving in the travel grooves through a heated oven housing. The skewers rotate between the parallel guide bars from a loading station to a discharge station. Heating elements mounted in the oven housing heat the food during transit through the oven housing on the skewers. Color coded wheels are attached to ends of the skewer to identify a food order for a customer.

20 Claims, 8 Drawing Sheets

SKEWERS MOUNTED ON AN OVEN CONVEYOR BELT

FIELD OF THE INVENTION

This invention relates to conveyor belts conveying food items through an oven. More particularly, it refers to a horizontal conveyor belt having multiple skewers mounted thereon for conveyance through a heating oven.

BACKGROUND OF THE INVENTION

Conveyor systems for skewered foods moving through a cooking oven are well known as shown in U.S. Pat. No. 4,440,071. Various brackets are used to hold the skewer ends in position.

U.S. Pat. Nos. 3,734,740 and 3,835,761 describe horizontal conveyor systems employed with skewers, the latter patent showing a system for automatically skewering food items.

U.S. Pat. Nos. 4,635,539; 5,271,316; 5,377,582; and 5,709,142 all describe vertical food conveyors carrying skewered foot items.

The above prior art methods all require substantial cooking time for the skewered food items and consequently use elaborate means of conveying the skewers. Apparatus is needed for simply moving precooked foods quickly through a heating zone for fast food take out sale of requested combinations of skewered food items. A means of identifying different orders going through the heating oven also is needed.

SUMMARY OF THE INVENTION

The present invention provides a means for heating precooked food on a skewer while the skewer is moved through an oven in an elongated horizontal path between heating elements located above and below the skewer. The invention provides a means for identifying orders for different combinations of food items for quick fast food turn around to customers. Multiple linked belt drives spaced apart transversely are engaged to multiple transversely mounted and longitudinally spaced apart parallel guide bars. The guide bars are juxtaposed to multiple fixed longitudinally mounted travel tracks or grooves. Skewers containing food items have wheels at each end for moving in the travel grooves. The skewers rotate between the parallel guide bars from a loading station to a discharge station where the heated food is retrieved. Discs on the end of each skewer identify by color code the identity of each order.

BRIEF DESCRIPTION OF THE DRAWINGS

The invention can be best understood by those having ordinary skill in the art by reference to the following description when considered in conjunction with the accompanying drawings in which.

DETAILED DESCRIPTION OF THE INVENTION

Throughout the following detailed description, the same reference numerals refer to the same elements in all figures.

Figure 1:
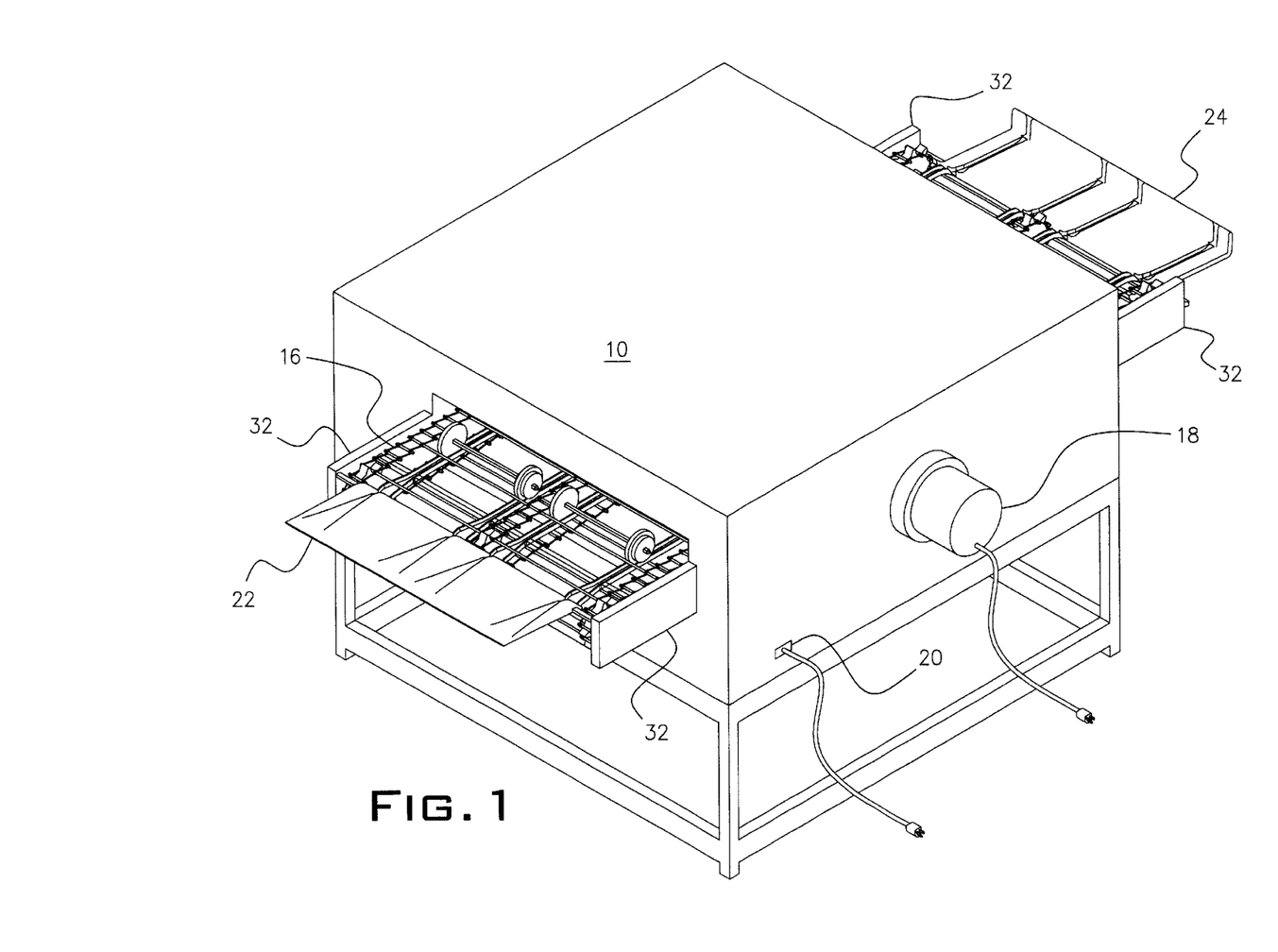
FIG. 1 is a perspective view of an oven heating skewers containing food items with wheels at the ends of the skewers moving in a groove on a conveyor system.
Figure 2:
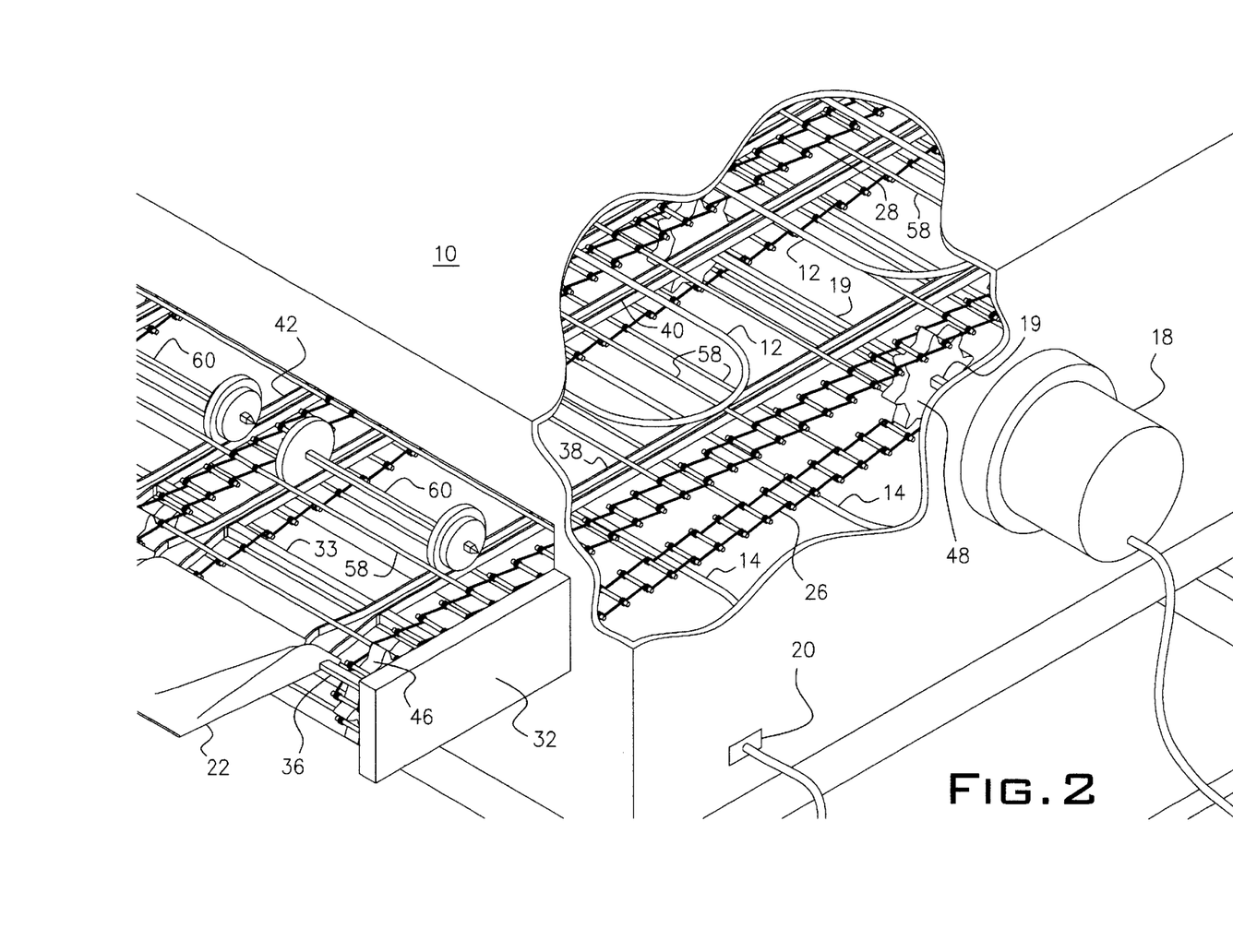
FIG. 2 is a cut away view of the skewers moving in a groove on an endless conveyor system within the oven.

Referring to FIGS. 1 and 2, the oven housing 10 is heated by radiant heat coils 12 and 14 mounted above and below an endless belt conveyor system 16. The conveyor system 16 is driven by an electric motor 18 turning shaft 19. The coils 12 and 14 are also heated by electric current through connection 20. The conveyor system 16 has a loading tray 22 and an unloading tray 24.

Figure 3:
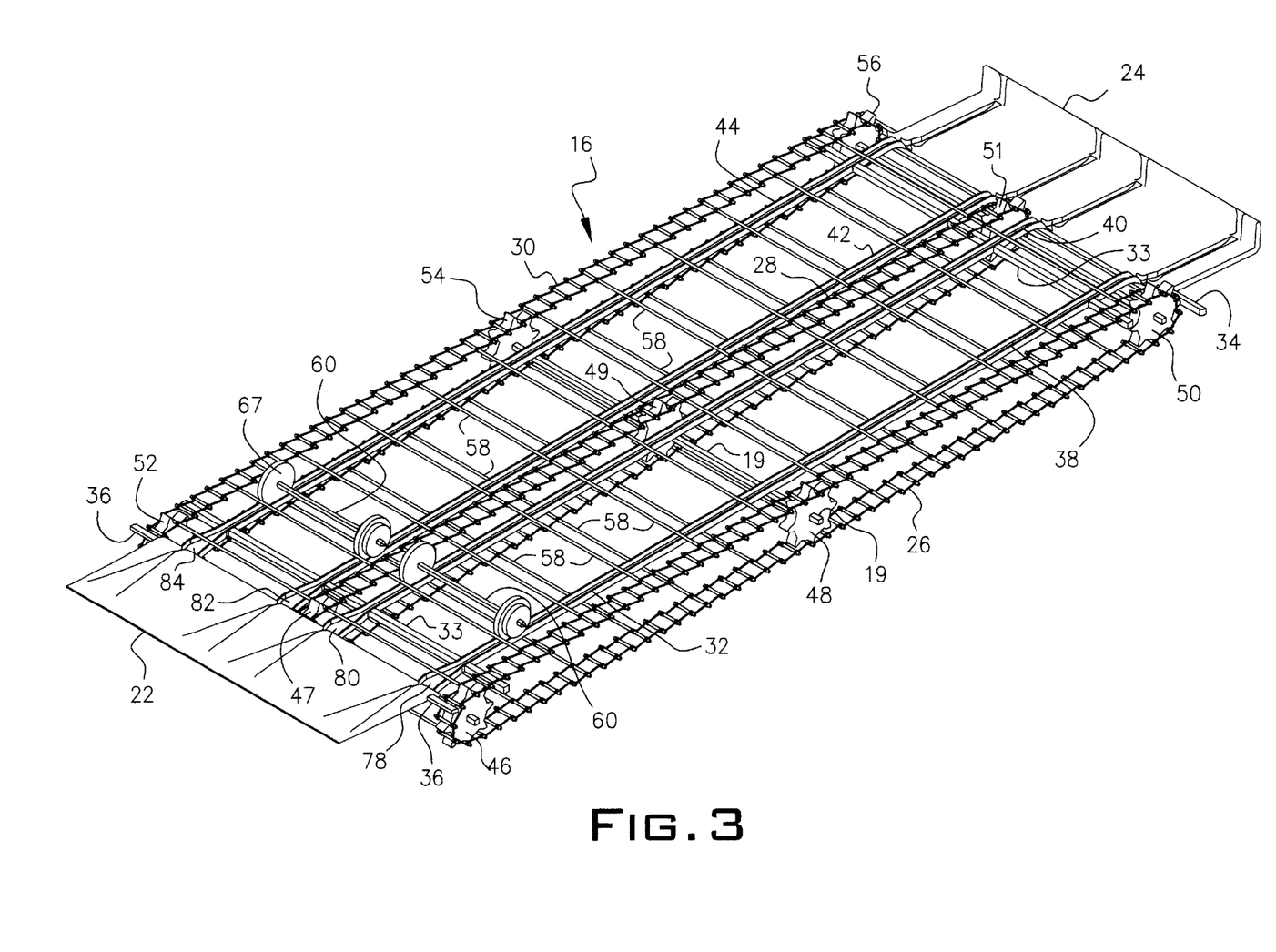
FIG. 3 is a perspective view of the skewers moving on the endless conveyor system.
Figure 4:
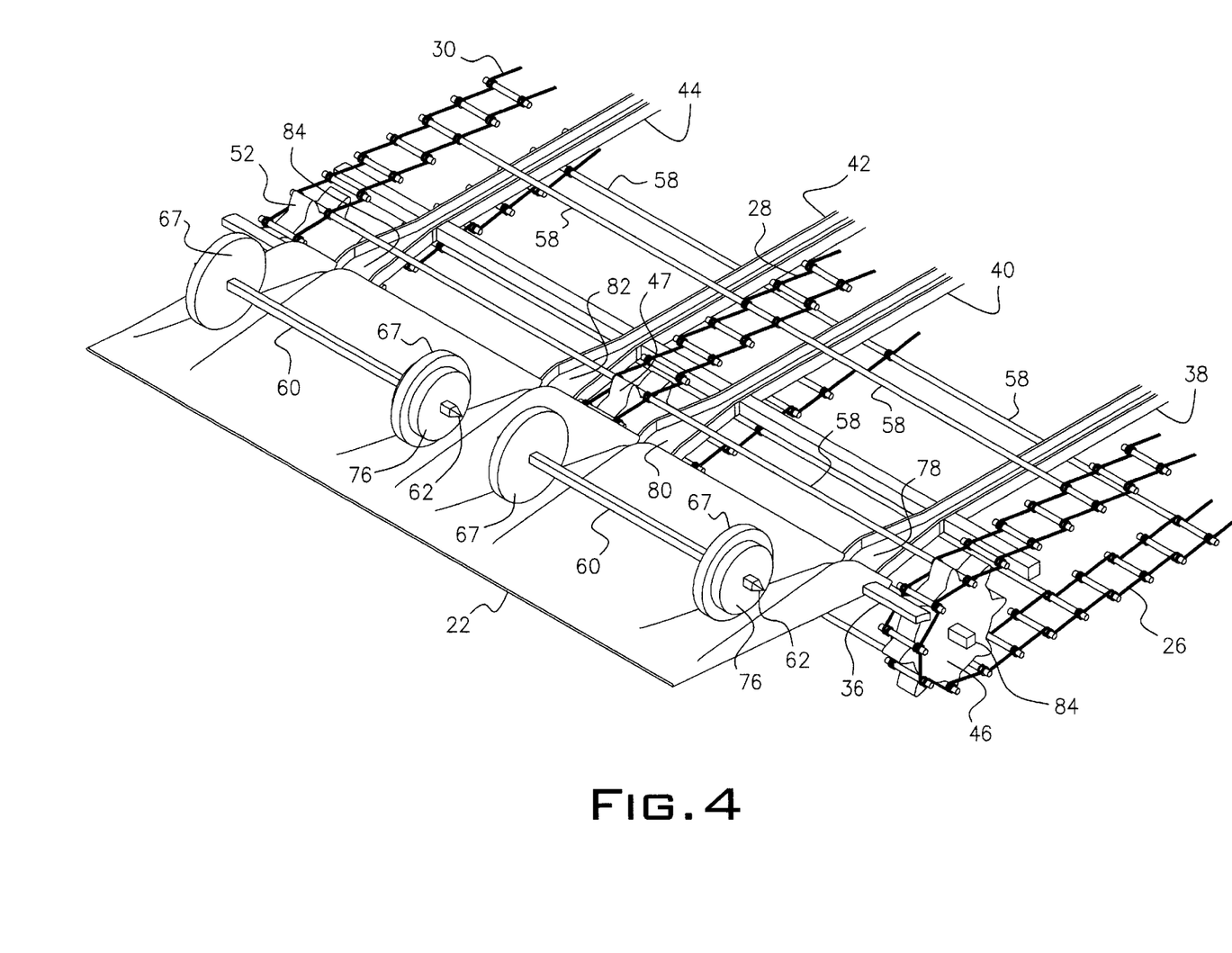
FIG. 4 is a partial front end view of the conveyor system.
Figure 5:
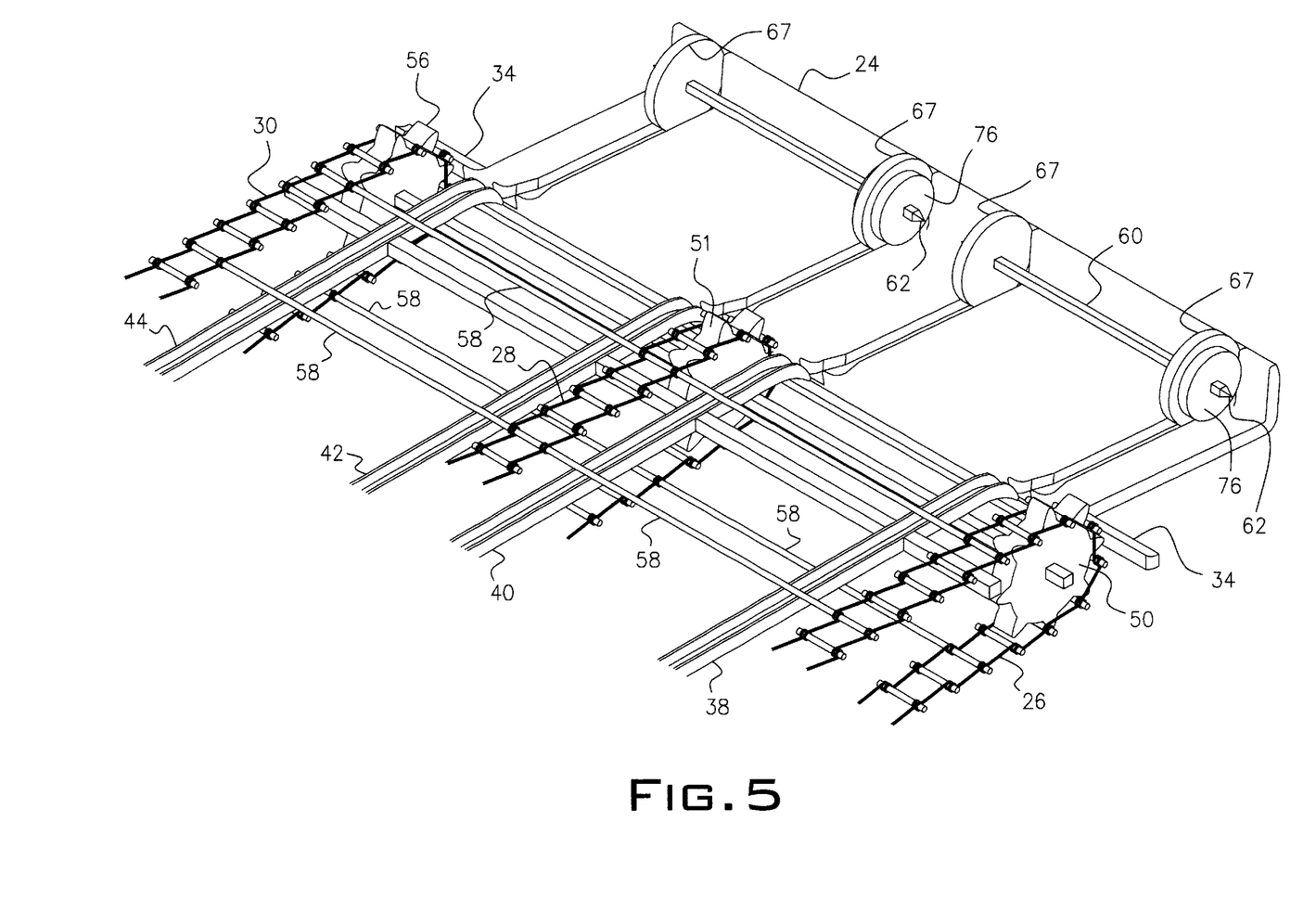
FIG. 5 is a partial rear end view of the conveyor system.
Figure 10:
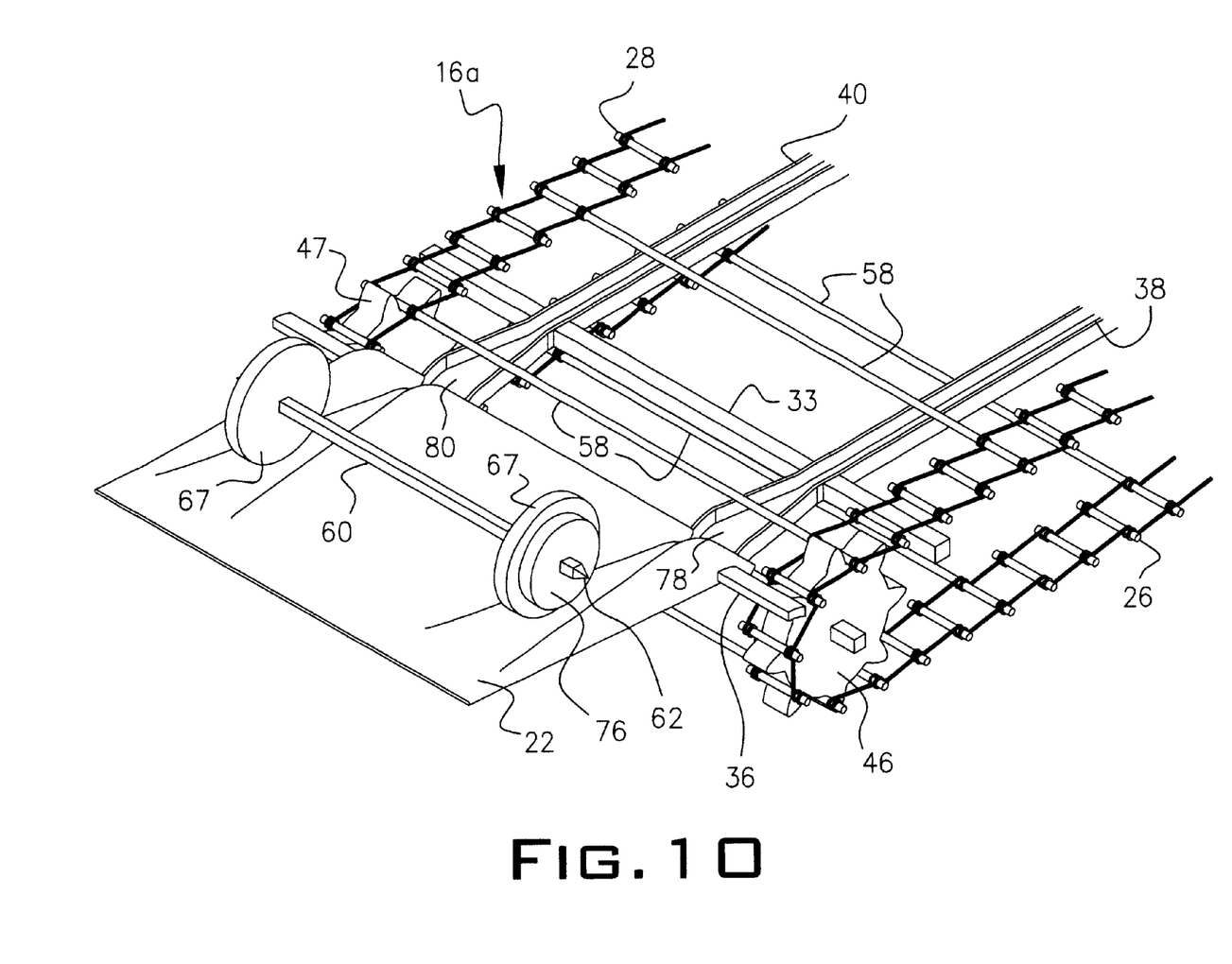
FIG. 10 is a partial perspective view of the conveyor system with two belt drives.

Referring to FIG. 3, the conveyor system 16 in a preferred embodiment, consists of three belts. A two belt system 16A as shown in FIG. 10 can be employed as can more than three belts. A first endless belt 26 is in an outboard position as seen in FIG. 3. A second endless belt 28 is in a middle position and a third endless belt 30 is on another outboard side. Four travel tracks or travel grooves are fixedly mounted on transverse support bars 33. The ends of each support bar 33 are attached to an inside surface of the oven housing 10. Mounting bar 34 adjacent the unloading tray 24 and mounting bar 36 adjacent to loading tray 22 support the trays. Each mounting bar 34 and 36 has ends attached to an inside surface of housing extensions 32. The first travel track 38 is fixedly mounted inboard of the first endless belt 26. A second travel track 40 is mounted on one side of the second endless belt 28. A third travel track 42 is mounted on an opposite side of the second endless belt 28. A fourth travel track 44 is mounted inboard of the third endless belt 30. In the two belt drive 16A, both travel tracks 38 and 40 are mounted inboard of the belt drives 26 and 28. Sprocket wheels 46, 48 and 50 corresponding to oppositely positioned sprocket wheels 52, 54 and 56, respectively, drive the first belt 26, second belt 28 and third belt 30. The sprockets are driven by a shaft 19 from the electric motor 18. The electric motor is a 1 hp standard electric drive motor.

Multiple spacer bars 58 are transversely attached to links on the first 26, second 28 and third 30 endless belts so that the spacer bars move with the endless belts. The spacer bars are spaced apart along the horizontal plane of the oven 10.

Referring to FIGS. 6–9, skewers 60 are designed with pointed tips 62 for use in spearing vegetable 61 or meat 63 food items so that they will be maintained securely on the skewer 60. Large wheel 67 is attached at each end of the skewer 60 by engaging a knob 65 in a groove 66 on the inner surface of a bore 68 through wheel 67. In this configuration the wheels hold the food items on the skewer. The wheels 67 at each end of the skewer 60 move on parallel grooves on tracks 38 and 40 or 42 and 44. A second set of smaller knobs 70 are used to engage into bore 72 in grooves 74 of a second smaller wheel 76. The smaller wheel 76 is color coded and placed on the skewer end to identify the order associated with the food items set forth on the skewer 60. An outward tug on both wheels 67 and 76 pulls the wheels 67 and 76 off the knobs 70 and 65 respectively.

Figure 6:
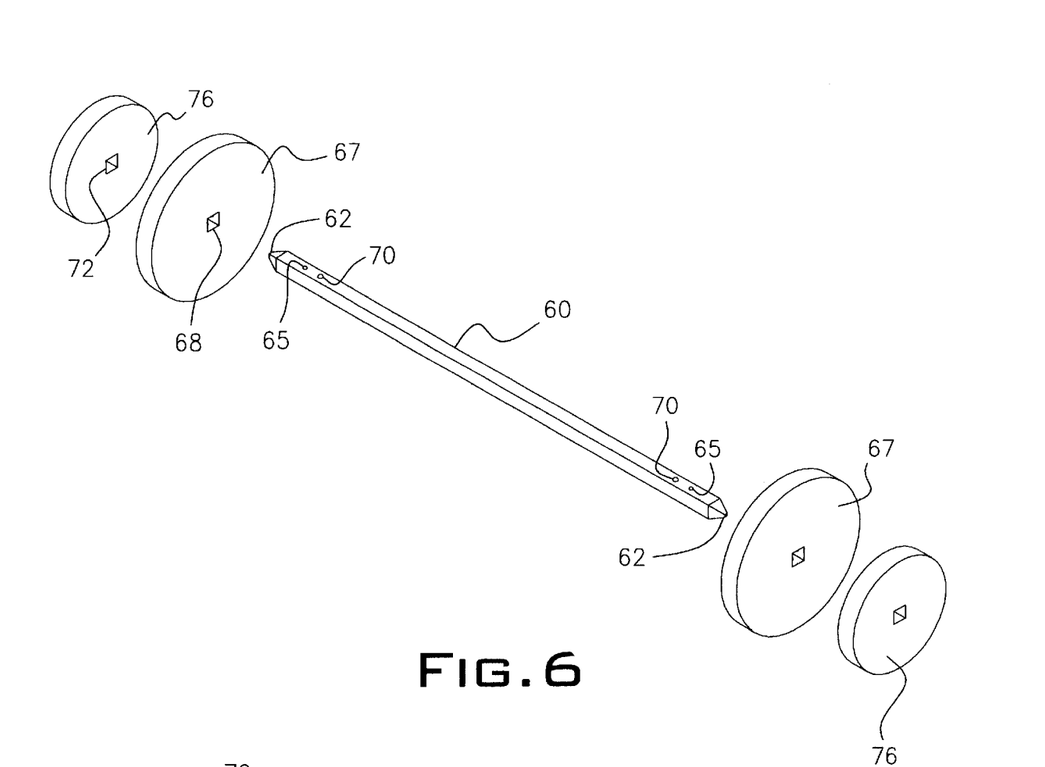
FIG. 6 is an exploded view of a skewer with end rings.
Figure 7:
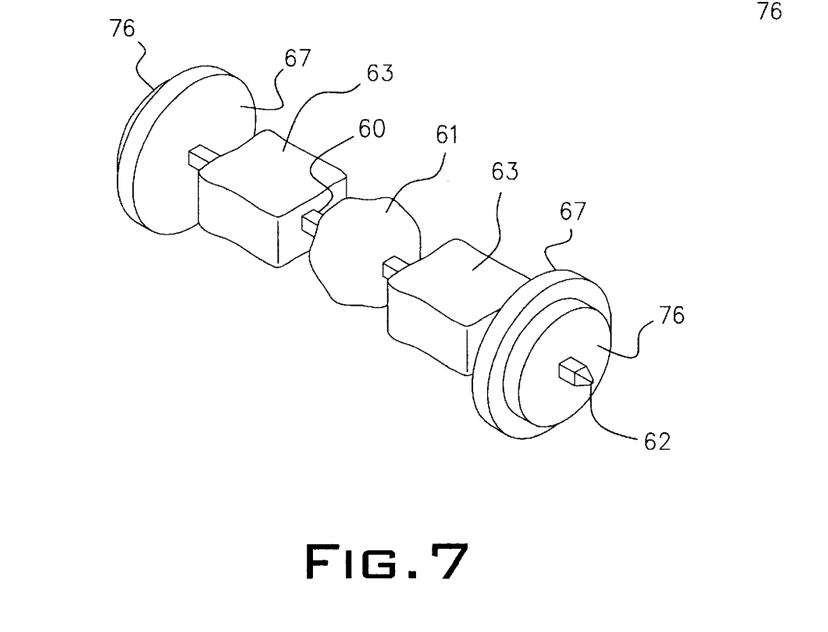
FIG. 7 is a perspective view of a skewer containing food items ready for insertion onto the conveyor system
Figure 8:
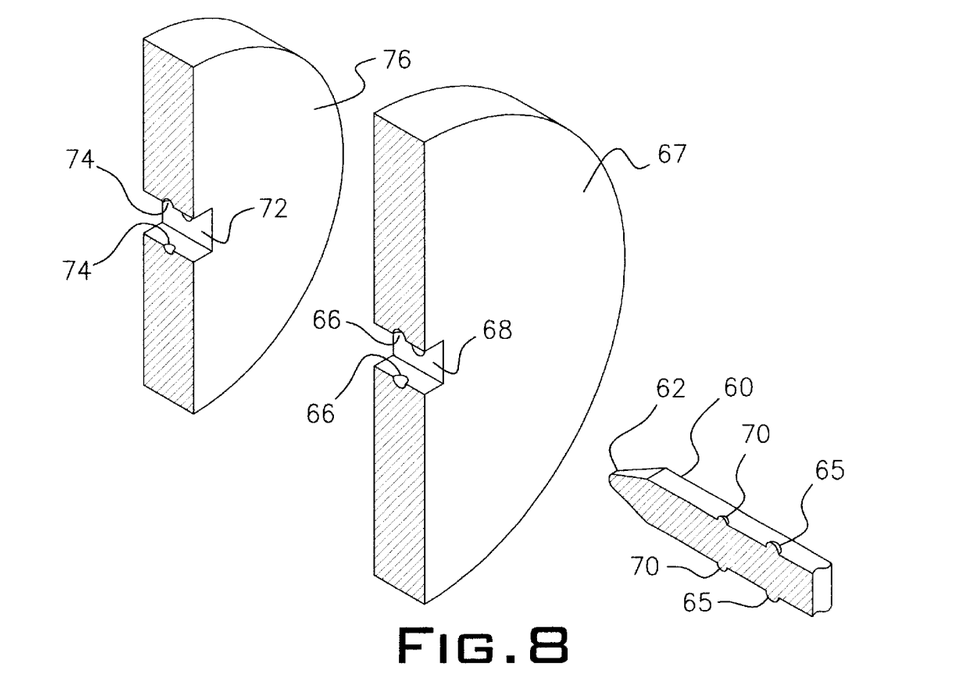
FIG. 8 is a break-away view of the skewer connection to the end rings.

The skewer 60 with mounted wheels 67 and 76 are placed in the loading tray 22 and allowed to pass into adjacent parallel tracks 38 and 40 or 42 and 44 and then move through oven 10 to heat the precooked food on the skewer and then exit at unloading tray 24.

Figure 9:
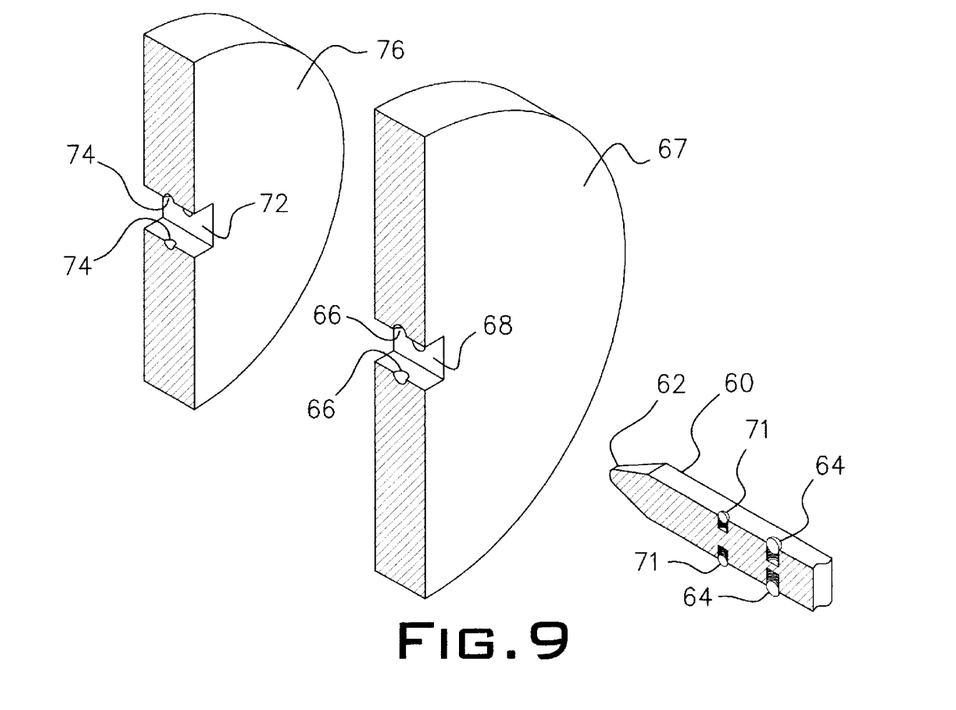
FIG. 9 is a break-away view as in FIG. 8 with alternate spring mounted buttons in section on a skewer end portion.

An alternate method of mounting wheels 67 and 76 on skewer 60 is shown in FIG. 9. Spring actuated balls 71 snap into grooves 74 on wheel 76 and spring actuated balls 64 snap into grooves 66 on wheel 67. An outward tug on both wheels 67 and 76 overcomes the force of the springs to allow the wheels 67 and 76 to be removed from grooves 66 and 74, respectively.

In operation of the apparatus, food items 61 and 63 are placed on a skewer 60 and wheels 67 are snapped on each end. Generally, the food items, especially the meat will be precooked prior to placing on the skewer. The particular meat item such as beef, lamb or chicken or vegetable such as onion, green pepper, red pepper, tomato, pineapple or mushroom will be ordered at a fast food counter. The correct combination of precooked food items will be placed on the skewer and a color coded wheel 76 is used to differentiate the order from another. The skewered food is then placed on tray 22 opposite groove entries 78 and 80 or 82 and 84. The conveyor system moves the skewer 60 between parallel spacer bars 58 between heating coils 12 and 14 to unloading tray 24. The wheels are then removed from the skewer 60 and the food items delivered to the proper customer indicated by color coded wheel 76.

The above description has described specific structural details embodying the invention. However, it will be within the skill of one having ordinary skill in the art to make modifications without departing from the spirit and scope of the underlying inventive concept of this apparatus and the method of its operation.

Having described the invention in detail the following is claimed:

1. Apparatus for heating and dispensing food items supported on elongated skewers, the apparatus comprising:
   a conveyor means within an oven housing for creating an elongated horizontal path of travel between a skewer receiving and discharge station;
   the conveyor means including two or more endless belt drives spaced transversely from each other relative to the length of the elongated horizontal path;
   driving means operatively engaged to the belt drives for moving the belt drives along the elongated horizontal path of travel;
   heating means for heating the food items, the heating means disposed within the oven housing along the elongated horizontal path of travel;
   multiple transversely spaced apart guide bars engaged to links on transversely adjacent belt drives and juxtaposed to at least two longitudinally mounted parallel spaced apart travel grooves;
   multiple skewers containing the food items adapted for conveyance along adjacent travel grooves between the guide bars;
   the skewer having a wheel at a first and second end for movement in the travel grooves and retaining the food items on the skewer;
   a means at a receiving station for guiding a skewer into the travel grooves and a means at a discharge station for receiving the skewer from the travel grooves after passing between the heating means.

2. The apparatus according to claim 1 wherein the driving means is an electric motor driving a shaft engaged to multiple sprocket wheels turning the endless belts.

3. The apparatus according to claim 1 wherein the heating means is an electrically operated coil.

4. The apparatus according to claim 1 wherein a color coded smaller wheel than the wheel at the first and second end of the skewer is mounted outboard of the wheel at the first and second end of the skewer.

5. The apparatus according to claim 1 wherein there are four longitudinally mounted parallel spaced apart travel grooves fixedly supported by multiple transversely mounted bars mounted at each end to a portion of the oven housing.

6. The apparatus according to claim 1 wherein the conveyor means includes a first, a second and a third endless belt drive.

7. The apparatus according to claim 1, wherein there are four longitudinally mounted parallel spaced apart travel grooves and a first, a second and a third endless belt drive.

8. The apparatus according to claim 7 wherein one travel groove is mounted inboard of the first endless belt drive, a second travel groove mounted inboard of the third belt drive, a third and fourth travel groove mounted on each side of the second belt drive.

9. The apparatus according to claim 1 wherein the means at the receiving station for guiding the skewers in a travel groove is a loading tray and a means at the discharge station for receiving the skewers from the travel grooves is an end tray.

10. The apparatus according to claim 9 wherein the loading tray and end tray are each supported by transverse support bars mounted at each end to a portion of a housing enclosing the conveyor means.

11. An apparatus for heating and dispensing food items supported on elongated skewers, the apparatus comprising
    a housing having electric heating coils on an inner surface of a ceiling and base;
    a conveyor having an elongated horizontal path of travel between a skewer receiving and discharge station and between the heating coils;
    the conveyor having two outboard and one middle endless belt drives spaced transversely from each other relative to the length of the elongated horizontal path;
    an electric motor driving sprockets engaged to the belt drives for moving the belt drives along the elongated path of travel;
    multiple transversely mounted guide bars, each guide bar engaged at each end to links on transversely adjacent belt drives;
    four longitudinally mounted parallel spaced apart travel grooves fixedly attached by support members to the housing;
    one travel groove mounted inboard of each outboard endless belt drive;
    one travel groove mounted on each side of the middle endless belt drive;
    multiple skewers containing food items conveyed along adjacent travel grooves between adjacent transversely mounted guide bars, the skewers having a wheel at each end to rotate in adjacent travel grooves, and;
    a means for inputting and retrieving the skewers containing food items to and from the conveyor belt drives.

12. The apparatus according to claim 11 wherein the electric motor turns a shaft engaged to the sprockets.

13. The apparatus according to claim 11 wherein a second wheel is attached to the skewer outboard of the wheel at each end, the second wheel being color coated to identify the food items on the skewer.

14. The apparatus according to claim 11 wherein the means for inputting the skewers is a loading tray and the means for retrieving the skewers is a receiving tray.

15. The apparatus according to claim 11 wherein each skewer has a knob at each end portion to engage a groove on an inner surface of a bore on the wheel.

16. The apparatus according to claim 11 wherein each skewer has a spring operated ball at each end portion to engage a groove on an inner surface of a bore on the wheel.

17. Apparatus for heating and dispensing food items supported on elongated skewers, the apparatus comprising:
- conveyor means for creating an elongated horizontal path of travel between a skewer receiving and discharge station;
- the conveyor having a first, second and third endless belt drive spaced transversely from each other relative to the length of the elongated horizontal path;
- driving means operatively engaged to the belt drives for moving the belt drives along the elongated horizontal path of travel;
- heating means for heating the food items, the heating means disposed above and below the elongated horizontal path of travel;
- multiple transversely spaced apart guide bars engaged to links on transversely adjacent belt drives and juxtaposed to four longitudinally mounted parallel spaced apart travel grooves;
- one travel groove mounted inboard of the first belt drive and a second travel groove mounted inboard of the third belt drive, a third and fourth travel groove mounted on each side of the second belt drive;
- multiple skewers containing the food items adapted for conveyance along adjacent travel grooves between the guide bars;
- the skewer having a wheel at a first and second end for movement in the travel grooves and retaining the food items on the skewer;
- a loading tray at the receiving station for guiding a skewer into the travel grooves and an end tray at the discharge station for receiving the skewer from the travel grooves after passing between the heating means.

18. The apparatus according to claim 17 wherein the driving means is an electric motor driving a shaft engaged to multiple sprocket wheels turning to the three endless belts.

19. The apparatus according to claim 17 wherein the four longitudinally mounted parallel spaced apart travel grooves are fixedly supported by a pair of transversely mounted bars mounted at each end to a portion of a housing enclosing the conveyor means.

20. The apparatus according to claim 17 wherein the loading tray and end tray are each supported by transverse support bars mounted at each end to a portion of a housing enclosing the conveyor means.

* * * * *